Feb. 21, 1967 C. F. OLDERSHAW ETAL 3,305,472
PURIFYING WATER WITH BROMINE
Filed March 13, 1963 2 Sheets-Sheet 1

INVENTORS.
Charles F. Oldershaw
Joseph F. Valle-Riestra

BY Griswold & Burdick
ATTORNEYS

INVENTORS.
Charles F. Oldershaw
Joseph F. Valle-Riestra
BY
Griswold & Burdick
ATTORNEYS

United States Patent Office 3,305,472
Patented Feb. 21, 1967

3,305,472
PURIFYING WATER WITH BROMINE
Charles F. Oldershaw, Concord, and Joseph F. Valle-Riestra, Walnut Creek, Calif., assignors to The Dow Chemical Company, Midland, Mich., a corporation of Delaware
Filed Mar. 13, 1963, Ser. No. 264,831
4 Claims. (Cl. 204—268)

This invention relates to a novel method and means for generating bromine from dilute aqueous bromide solutions. More particularly, this invention relates to a method and means for purifying and disinfecting water with bromine, wherein bromine is produced electrolytically from very dilute bromide contained within the water.

Efficient and relatively inexpensive means for purifying water have long been sought. Bacteria, algae, and other undesirable microorganisms tend to build up in water used in the vicinity of food treatment, for cooling towers, for swimming pools, and the like. The problem is especially critical in swimming pool water which may be used by human beings. Matter added to the water to destroy such microorganisms should not be in quantities sufficient to cause irritation of the skin or eyes and should ordinarily be in amounts below the normal human taste threshold.

Bromine and chlorine have been found to be appropriate materials for the purification of swimming pool water and the like. Chlorine is probably the most common element of the two in use at the present time in swimming pool water. Bromine is, however, more desirable. It shows comparable purifying and disinfecting qualities, but has the advantages of less skin and eye irritation, and substantial lack of undesirable taste at concentrations ordinarily used with chlorine. Further, bromine imparts a sparkling blue coloration to the water.

In spite of the distinct advantages of bromine over chlorine, bromine has not found wide acceptance as a purifying agent in swimming pools. This is probably due to the fact that a safe, simple method and means for brominating the water has not been available prior to the present invention. The average swimming pool owner is neither desirous nor qualified to handle liquid bromine nor is he willing to bear the expense of other previously known methods of adding bromine to the water.

In the past, various methods and means have been suggested for the direct electrolytic halogenation of water. These methods usually require combinations of high voltages, special diaphragms, high current densities, high salt concentrations, and the like, and have been generally beset by problems such as low current efficiency and high electrode wear.

It is an object of the present invention to provide a direct electrolytic bromination method utilizing a cell which is safe and relatively simple in operation, which is operable at relatively low voltages and current densities, requires relatively low concentration of bromide salt, and has high current efficiencies as well as minimal electrode wear.

Other objects and advantages will become apparent in the course of the following specification when taken in conjunction with the appended drawings in which:

FIGURE 1 is a schematic illustration of a typical swimming pool installation of the water purification apparatus of the present invention, FIGURE 2 is a simplified isometric schematic of the apparatus of the present invention, FIGURE 3 is a more detailed isometric schematic, partially in section, of the apparatus of the present invention, FIGURE 4 is a side elevation, in section, of the apparatus of the present invention, FIGURE 5 is a bottom end view of the apparatus of the present invention, FIGURE 6 is a sectional view of the apparatus of the present invention taken at plane 6—6 of FIGURE 4.

FIGURE 7 is a sectional view of the apparatus of the present invention taken at plane 7—7 of FIGURE 4, and FIGURE 8 is a sectional view of the apparatus of the present invention taken at plane 8—8 of FIGURE 4.

In accordance with the present invention as applied to a swimming pool, water is purified by bromine electrolytically produced from dilute aqueous alkali bromide solution. In the present specification, the term "alkali bromide" is meant to include any water soluble non-toxic bromide salt, such as sodium bromide, potassium bromide, and the like. For simplicity in understanding the present process, reference will be made to FIGURE 2 which is a schematic of a electrolytic cell, over-simplified for clarity. Water is removed from the swimming pool as illustrated in FIGURE 1 and its bromide ion concentration is adjusted, if necessary. A stream 10 of the bromide containing water is then introduced to the cell at the opening of the space 11 between cell electrodes 12. Direct current is applied to the electrodes 12 by means of wires 14 connected between contact studs 15 and an external direct current source. As the bromide containing water passes through the cell, bromide is produced at the anode. Bromine produced in the cell is carried therefrom by the flowing water.

Exit water 16 which contains bromine then leaves the cell and is returned to the swimming pool. As is well known, the bromine in the water accomplishes the destruction of harmful or otherwise undesirable organisms and thus maintains the swimming pool water substantially free of harmful "bacteria," "algae" and other microorganisms, in a condition safe for human use.

Water entering the cell should usually contain from about 150 to about 625 parts per million (p.p.m.) of bromide ion, and preferably from about 230 to about 470 p.p.m. of bromine ion. Higher concentrations approach the taste threshold in normal humans and are thus undesirable. Concentrations of bromide ion below about 150 p.p.m. usually result in lowered cell efficiency and deterioration of the electrodes. Appropriate sources of bromides are the non-toxic water soluble alkali bromides, preferably sodium bromide and potassium bromide.

As bromine produced in the cell performs its sanitizing function in the treated water it is generally reduced to the bromide state, thus providing a constant source of bromide ion for the cell if the water is to be recycled through the cell. Once the system is in operation, bromide need be added thereto only as make up to compensate for loss through pool leakage or spillover, swallowing, and the like.

In order to provide maximum efficiency, bromide containing water should enter the cell at a flow rate sufficient to provide, within the cell, a Reynolds number of at least 2300. The Reynolds number is, of course, also dependent on the spacing 11 of the electrodes 12 which must also be considered in the flow rate determination. Lower flow rates usually result in anode degradation and lowered cell efficiency, while higher flow rates are not objectionable. At an electrode spacing of about ⅛ inch, typically, linear flow velocities of from about 3 to about 8 feet per second are operable, with a flow velocity of about 5 feet per second being preferred. While a preferred spacing for the electrodes is about ⅛ inch, distances from about 1/16 inch to about ¼ inch are suitable. Appropriate electrode spacing in accordance with the present invention is from about 1/16 inch to about ¼ inch, with a spacing of about ⅛ inch being preferred.

Ordinarily, as shown in FIGURE 2, the electrodes 12 are constructed as elongated bodies having opposing surfaces parallel to one another. Suitable materials for the electrodes in the present invention are those which are relatively inert to the chemicals and conditions found in the cell during electrolysis. An appropriate electrode material is graphite.

Cell voltage should be such that a current density of from about 0.01 to about 0.15 ampere per square inch and preferably from about 0.015 to about 0.030 ampere per square inch is maintained. Ordinarily a cell voltage of from about 3.0 to about 3.7 volts will result in an appropriate current density within the operable range as long as slot spacing, electrolyte concentration, and flow velocity are kept reasonably within the limits previously set forth.

A significant problem encountered in the electrolytic production of bromine from dilute solutions has been that of electrode passivation. It is believed that when a cell is operated continuously over relatively long periods of time a build up of metal oxides or hydroxides takes place on the cathode. Apparently, this is the cause of electrode passivation. It has been found that the problem of electrode passivation may be substantially obviated in accordance with the objects of the present invention by reversing the polarity of the electrodes at frequent intervals. Reversal of polarity at intervals of from about five minutes to about three hours will generally give the desired result of minimal electrode passivation. Conventional apparatus having a time thereon may be employed to accomplish polarity reversal.

Concentrations of bromine in water most effective for sanitizing water may range from about 0.6 to about 2.0 parts per million, and preferably from about 0.6 to about 1.0 part per million. Greater concentrations of bromine may be used, if desired, but may be objectionable to some people using the swimming pool, and, in any event, are ordinarily wasteful. Maintenance of the bromine concentration in the main body of swimming pool water may be accomplished by running the cell continuously or intermittently, depending on the volume of water to be treated, cell size, and the like.

Under ordinary swimming pool operating conditions chlorides, particularly sodium chloride, are usually present. The presence of chloride in amounts up to about 500 parts per million are tolerable in the water without deleterious effect on the process and apparatus of the present invention. Actually, higher concentrations of chloride ion do not adversely affect the process, but are objectionable from the standpoint of taste of the pool water.

Once the process and apparatus of the present invention have been in operation for a period of time, some bromine will be present in the stream of water fed to the cell. Bromine, present in the feed water in amounts as high as 20 parts per million, has been found to have no effect on the cell efficiency.

Also produced in the process and apparatus of the present invention is a substantial amount of bromate ion. Bromate ion is generally of little value in the destruction of harmful or undesirable organisms, but is not harmful to the electrodes of the cell of the present invention. Bromate ion has been found to be produced in preference to oxygen in the present cell, thus helping to prevent electrode deterioration. Cell efficiency, taken as the sum of bromine and bromate actually produced versus the theoretical, approaches 100 percent when the cell is operated in accordance with the present invention. Further, bromate ion in the presence of bromide ion tends to decompose in an equilibrium reaction to form bromine. The equilibrium then tends to be driven toward bromine formation as bromine in the water is used up. Thus, actual usable bromine formed by the present process is in excess of the bromine actually produced in the cell.

Usually some bromate ion will eventually become part of the feed water to the cell. The level of bromate concentration has been found to be unimportant as regards cell operation. In relatively long term (60–120 days) operation, the overall concentration of bromate ion has been found to level off at about fifteen parts per million. Apparently decomposition of bromate takes place so as to establish an equilibrium concentration of about fifteen parts per million. This concentration (15 p.p.m.) does not adversely affect the suitability of the swimming pool water for ordinary human use.

A preferred embodiment of the present invention is schematically shown in FIGURE 3. Three major compartments are formed by vertically dividing a substantially box like apparatus in a direction transverse to inlet water stream 10. The first 20 and second 21 major compartments are horizontally divided approximately in half by wall 22 positioned in a plane parallel to inlet water stream 10. One half of first major compartment 20 is vertically divided approximately in half by partition 23 so as to form inlet chamber 24 and outlet chamber 25. Both halves of second major compartment 21 are vertically divided by a plurality of electrodes 12, spaced and constructed as hereinafter specified in reference to FIGURE 2. Contact studs 15 are positioned in contact with the right and left electrode of each half of second major compartment 21.

Third major compartment 26 is vertically divided approximately in half by partition 27 so as to form minor compartments 28 and 29. Ordinarily the composite of first, second and third major compartments is encased so as to form, from external appearances, a unitary article.

In operation then, appropriate water 10 enters inlet chamber 24 and flows between electrodes 12 adjacent said inlet chamber 24. Water then enters minor compartment 28, by-passes horizontal wall 22 and flows between electrodes 12 occupying the quarter of major compartment 21 connecting minor compartment 28 and the undivided half of major compartment 20. After entering said major compartment 20, the water then flows between electrodes 12 to minor compartment 29, thereafter passing between electrodes 12 to outlet chamber 25, leaving the outlet chamber 25 of the composite electrolytic cell in stream 16.

Voltage required between upper and lower electrodes 12 in each half of major compartment 21 is the sum of the individual cell voltages required. As hereinbefore specified, if electrode spacing, concentration of bromide in the water, and flow rates are in accordance with the present invention, individual cell voltage required to give the desired current density will ordinarily range from about 3.0 to about 3.7 volts. Ordinarily then, the voltage required between the top and bottom electrode will be the individual cell voltage multiplied by the number of spaces between electrodes 12. For convenience, the two banks of cells may be connected in series, if desired.

FIGURE 4 presents a preferred embodiment of the present invention in substantial detail.

FIGURE 4 shows the composite cell of FIGURE 3 in substantial detail and positioned vertically with water inlet means 31 and outlet means 32 at the bottom and encased in a protective shell 30.

Figure 1:
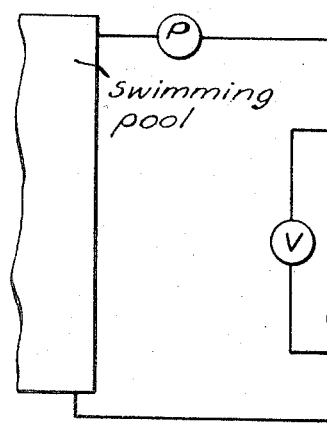
Figure 2:
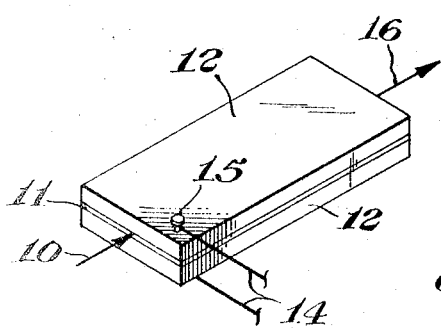

Shell 30 which has a closed and an open end is provided with face plate 33, which is fastened to said open end thereby serving as closure means for said open end of said shell 30. Face plate 33 is provided with inlet means 31 and outlet means 32 communicating with inlet chamber 24 and outlet chamber 25, respectively. Means of communication 34 between contact poles 15 and the exterior of face plate 33 is also provided, usually in the form of a pipe, tube, or the like.

Attached to face plate 33, by suitable means, is a rectangular box like case 35 having a substantially square cross section. Wall 22 divides major compartments 20 and 21 substantially in half. Partition 23 separates one half of major compartment 20 into substantially equal sized input chamber 24 and output chamber 25. Within the portion of major compartment 20 which defines chambers 24 and 25 is positioned a ground block 36, suitably of graphite, adjacent major compartment 21, said ground block 36 having slots 37 corresponding to slots 11 between electrodes 12 in said major compartment 21. The ground block 36 operates as a safety feature in that it prevents stray currents from leaving the confines of the apparatus.

A weep hole 38 communicates between major compartment 20 and the annular space between case 35 and shell 30. The weep hole 38 may be located wherever convenient within major compartment 20. In operation, communication between major compartment 20 and the annular space within shell 30 is desirable to equalize pressures and prevent rupture of case 35 in the event high pressure were to develop within said case 35.

Insulating spacers 39 are positioned at each end of major compartment 21. Spacers 39 generally correspond in thickness and width with the electrodes 12 and are similarly spaced. The purpose of the spacers is to prevent possible short circuiting of the cells whereby current might flow other than across slots 11.

Contact studs 15 and 15A are positioned so as to maintain electrical communication between electrodes 12 and the exterior of casing 35. In the embodiment illustrated in FIGURES 4–8, studs 15 are electrically connected so as to connect both banks of electrodes in series. Sealing means 40 is employed to prevent contact between water in shell 30 and studs 15 and 15A.

Where necessary, stiffeners 41 are employed to maintain a degree of rigidity between casing 35 and shell 30. Chemically inert, insulating material is generally preferred for this purpose.

Partition 27, which divides major compartment 26 into minor compartments 28 and 29, is usually of insulating material and may be an extension of the centrally located spacer from adjacent major compartment 21. End wall 42 of compartment 29 may be provided with an aperture 43 sealed by a flapper assembly comprising a weight 44 fastened to a flexible sealing sheet 45. The weight 44 is sufficient under normal operational conditions to cause the flexible sheet 45 to seal aperture 43. In the event of a sudden high pressure differential between the interior and exterior of case 35, where the high pressure is within said case 35, the weight 44 is lifted by the pressure, thus causing water to flow into the annular space within shell 30. By this method, sudden internal pressure increases may be relieved automatically, the weight 45 resealing aperture 43 when pressure balance has been regained.

Shell 30 has removal means 46 attached thereto whereby water may be removed from the annular space within said shell. Suitable fixtures and hardware to facilitate installation may also be appended to shell 30, if desired.

Figure 4:
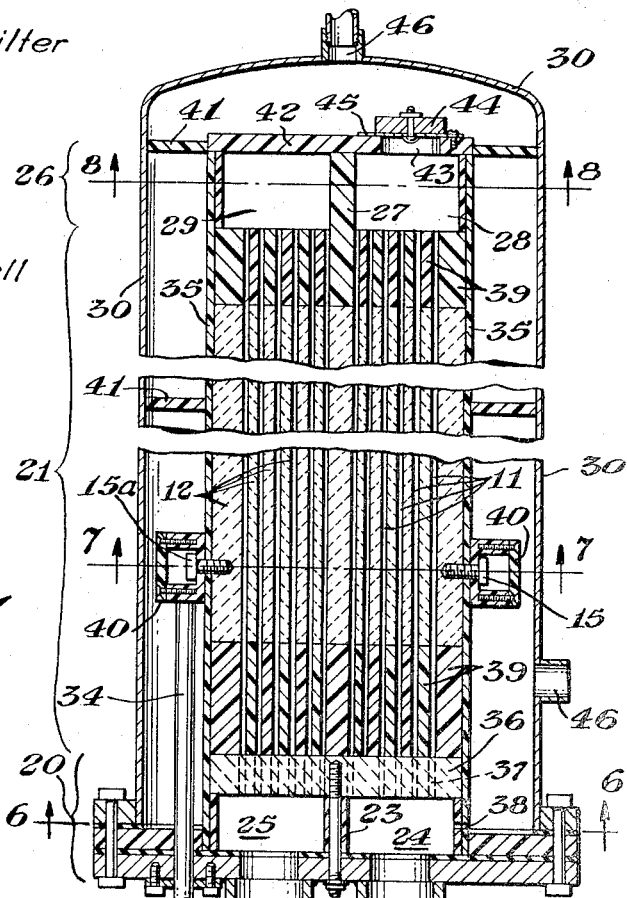
Figure 3:
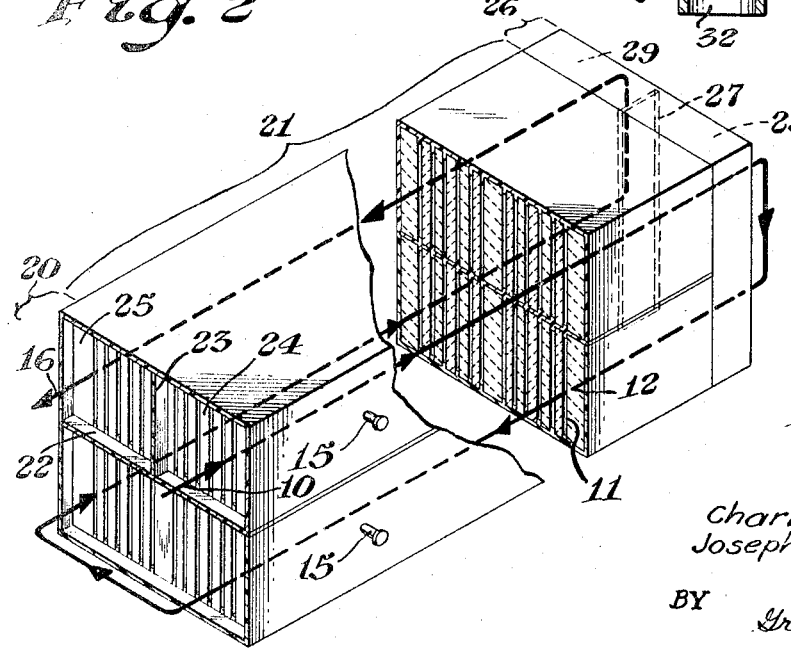
Figure 6:
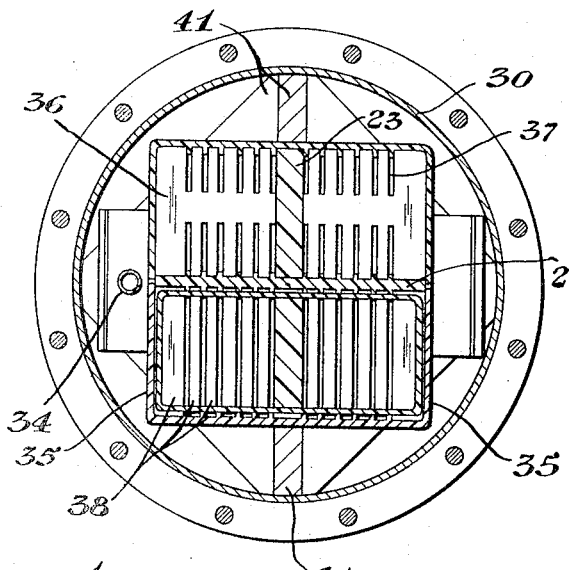
FIGURES 6–8 are sectional views of the preferred embodiment of the present invention taken along the corresponding planes noted in FIGURE 4, and are presented to amplify and clarify the following discussion of said preferred embodiment.
Figure 8:
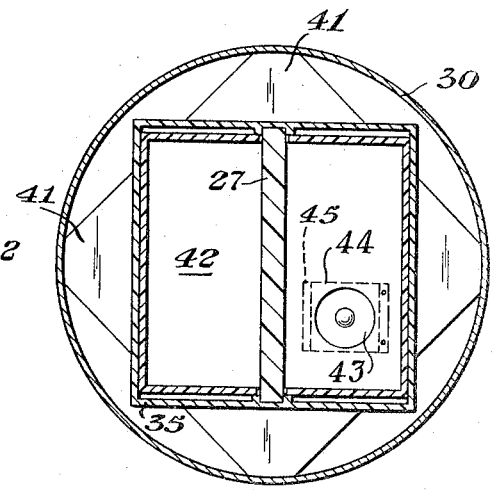
Figure 5:
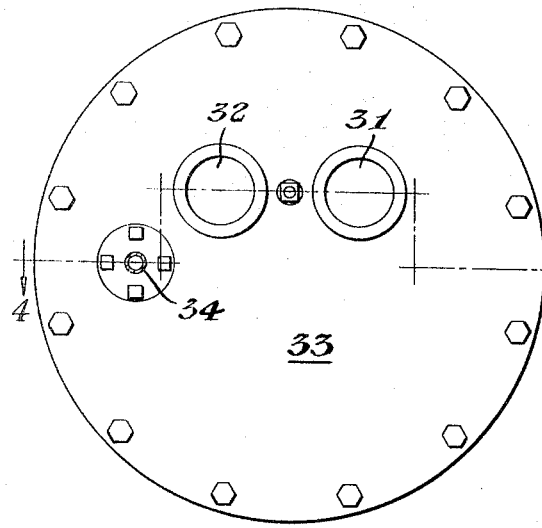
FIGURE 5 shows one end of the preferred embodiment of the present invention and illustrates in particular the water inlet and outlet means as well as the electrical communication means from the exterior of the device to the electrode contact poles.
Figure 7:
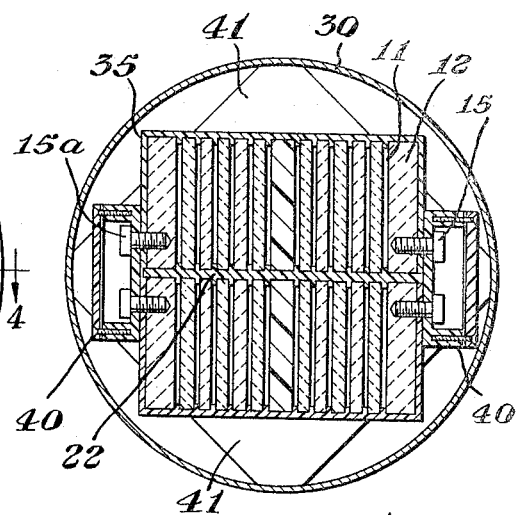

With the flapper assembly 44–45 and aperture 43 positioned as illustrated in FIGURE 4, the apparatus is preferably positioned vertically as shown in said FIGURE 4 with face plate 33 at the bottom. With minor adjustment in said aperture and flapper assembly the apparatus may be positioned as desired, vertically, horizontally, or otherwise.

In the preferred embodiment illustrated in FIGURE 4, shell 30 and face plate 33 are of steel coated on the interior surfaces with a suitable chemically inert, non-conducting, impervious plastic material to prevent corrosion. Vertical wall 22, horizontal dividers 23 and 27, communication means 34, case 35, spacers 39, sealing means 40, stiffeners 41, and end wall 42 are also of chemically inert, non-conducting plastic.

Ground block 36 is of one inch thick graphite. Electrodes 12 are of graphite, the spaces 11 between electrodes being one eighth inch. For structural strength, the centrally disposed electrode, and the outermost electrodes are usually formed somewhat thicker than the remainder of the electrodes. Spacers 39 are formed to correspond with the size and shape of thin respective electrodes. Contact studs 15 and 15A are preferably fabricated of copper, studs 15 being electrically connected together.

In general, plastic screws are used to join internal portions of the apparatus as shown. Suitable plastic screws are of a material (such as nylon) which is chemically inert, electrically non-conducting, and relatively impervious to aqueous solutions employed in the process of this invention.

In operation, the apparatus of the present invention is preferably used in conjunction with a filter of the type ordinarily used to remove solids from swimimng pool water. Unfiltered water may contain debris in sufficient quantity to short circuit one or more cells or otherwise adversely affect the method and apparatus of the present invention.

The following examples are set forth to illustrate, and are not to be construed to limit, the present invention.

*Example*

A unit of the preferred design illustrated in FIGURE 4 was constructed having two banks of graphite electrodes defining twelve slots in each bank. The slot dimensions were ⅛ x 28 x 3 inches.

In operation, a throughput of about 35 gallons per minute of water containing about 350 parts per million of sodium bromide (equivalent to about 270 parts per million of bromide ion) and a cell current density of about 0.022 ampere per square inch of electrode surface area were maintained. When used in conjunction with a 24,000 gallon swimimng pool and a filter, seven hours per day of cell operation was sufficient to maintain the requisite bromine concentration in the pool water. Electrode polarity was reversed at approximately fifteen minute intervals.

After about sixty days of continuous use, no observable electrode wear had taken place. From time to time, depending on pool use, leakage, and other conditions, small amounts of make up sodium bromide were added to the pool water so as to maintain the bromide ion concentration within the preferred operational limits (230–470 parts per million).

*Comparative example*

Water containing about 510 parts per million sodium chloride (equivalent to about 310 parts per million chloride ion) was electrolyzed in substantially the same manner described above except that a single cell was employed.

It was found that oxygen was produced in sufficient amount to rapidly degrade the graphite electrodes. For purposes of this invention, then, chloride ion may not be substituted for bromide ion.

Various modifications may be made in the present in-invention without departing from the spirit or scope thereof, and it is to be understood that we limit ourselves only as defined in the appended claims.

We claim:
1. An electrolytic cell comprising a pair of electrode banks, each bank containing a plurality of flat parallel electrodes which define parallel slots, said banks being mounted in such a manner that the slots defined by the electrodes in each bank are parallel to the direction of flow of the liquid to be electrolyzed, a substantially rectangular case of insulating material surrounding said electrode banks, divider means defining compartments within said case at each end of said electrode banks whereby said liquid to be electrolyzed is caused to pass the length of said electrode banks twice in one direction and twice in the opposite direction, each pass being made through different slots, a protective shell having a face plate attached thereto and surrounding said case, said face plate defining apertures through which fluid may enter and leave said electrolytic cell, and electrical communication means whereby electrical contact is maintained between said electrode banks and an external direct current source, said electrode banks being electrically connected in series.

2. An electrolytic cell comprising, a pair of electrode banks, each bank containing a plurality of flat parallel electrodes which define parallel slots, said banks being mounted in such a manner that the slots defined by the electrodes in each bank are parallel to the direction of flow of the liquid to be electrolyzed, a substantially rectangular case of insulating material surrounding said electrode banks, divider means defining compartments within said case at each end of said electrode banks whereby said liquid to be electrolyzed is caused to pass the length of said electrode banks twice in one direction and twice in the opposite direction, each pass being made through different slots, a protective shell having a face plate attached thereto and surrounding said case, said face plate defining apertures through which fluid may enter and leave said electrolytic cell, and electrical communication means whereby electrical contact is maintained between said electrode banks and an external direct current source, said electrode banks being electrically connected in series, and polarity reversing means interconnected between said electrolytic cell and said direct current source.

3. An electrolytic cell comprising, a pair of electrode banks, each bank containing a plurality of flat parallel electrodes which define parallel slots, said banks being mounted in such a manner that the slots defined by the electrodes in each are parallel to the direction of flow of the liquid to be electrolyzed, a substantially rectangular case of insulating material surrounding said electrode banks, divider means defining compartments within said case at each end of said electrode banks whereby said liquid to be electrolyzed is caused to pass the length of said electrode banks twice in one direction and twice in the opposite direction, each pass being made through different slots, a protective shell having a face plate attached thereto and surrounding said case, said face plate defining apertures through which fluid may enter and leave said electrolytic cell, slotted graphite block means located within the case adjacent the protective shell face plate entry and exit apertures whereby stray electric current will be grounded and prevented from leaving said electrolytic cell through the fluid to be electrolyzed, and electrical communication means whereby electrical contact is maintained between said electrode banks and an external direct current source, said electrode banks being electrically connected in series.

4. An electrolytic cell comprising, a pair of electrode banks, each bank containing a plurality of flat parallel electrodes which define parallel slots, said banks being mounted in such a manner that the slots defined by the electrodes in each are parallel to the direction of flow of the liquid to be electrolyzed, a substantially rectangular case of insulating material surrounding said electrode banks, divider means defining compartments within said case at each end of said electrode banks whereby said liquid to be electrolyzed is caused to pass the length of said electrode banks twice in one direction and twice in the opposite direction, each pass being made through different slots, pressure relief means attached to said case whereby excess fluid pressure within said case will cause fluid to flow out of said case thereby substantially equalizing the pressure inside said case with the external pressure whereby destruction of said case is prevented, a protective shell having a face plate attached thereto and surrounding said case, said face plate defining apertures through which fluid may enter and leave said electrolytic cell, and electrical communication means whereby electrical contact is maintained between said electrode banks and an external direct current source, said electrode banks being electrically connected in series.

References Cited by the Examiner

UNITED STATES PATENTS

| | | | |
|---|---|---|---|
| 580,919 | 4/1897 | Woolf | 204—275 |
| 897,633 | 9/1908 | Landis | 204—275 |
| 968,492 | 8/1910 | McDorman | 204—268 |
| 1,000,608 | 8/1911 | Kenevel | 204—269 |
| 1,541,947 | 6/1925 | Hartman et al. | 204—268 |
| 1,996,799 | 4/1935 | Evans | 204—275 |
| 2,580,808 | 1/1952 | Marks et al. | 210—62 |
| 2,887,444 | 5/1959 | Lindstaedt | 204—152 |

JOHN H. MACK, *Primary Examiner.*

MORRIS O. WOLK, *Examiner.*

M. E. ROGERS, D. R. JORDAN, *Assistant Examiners.*